United States Patent [19]

Yu et al.

[11] Patent Number: 5,787,347

[45] Date of Patent: Jul. 28, 1998

[54] METHOD AND APPARATUS FOR SELECTING A CELLULAR SYSTEM FOR COMMUNICATION WITH A CELLULAR TELEPHONE IN A ROAMING AREA

[75] Inventors: I-Hsiang Yu, Lexington; Daniel G. Borkowski, Acton; Kenneth Chao, Waltham, all of Mass.

[73] Assignee: GTE Laboratories Incorporated, Waltham, Mass.

[21] Appl. No.: 570,226

[22] Filed: Dec. 11, 1995

[51] Int. Cl.$^6$ .............................. H04M 11/00; H04Q 7/00
[52] U.S. Cl. .............................. 455/440; 455/445
[58] Field of Search ........................... 379/59, 58, 60; 455/33.1, 33.2, 54.1, 440, 445, 443, 435

[56] References Cited

U.S. PATENT DOCUMENTS

| | | | |
|---|---|---|---|
| 4,916,728 | 4/1990 | Blair | 379/59 |
| 5,159,625 | 10/1992 | Zicker | 379/59 |
| 5,235,633 | 8/1993 | Dennison et al. | 455/33.2 X |
| 5,327,144 | 7/1994 | Stilp et al. | 379/59 X |
| 5,564,068 | 10/1996 | Nguyen | 379/59 X |
| 5,568,153 | 10/1996 | Beliveau | 455/33.1 X |
| 5,586,338 | 12/1996 | Lynch et al. | 455/33.1 X |
| 5,613,205 | 3/1997 | Dufour | 455/33.2 |
| 5,613,213 | 3/1997 | Naddell et al. | 455/9 X |

*Primary Examiner*—David R. Hudspeth
*Assistant Examiner*—Scott Richardson
*Attorney, Agent, or Firm*—Leonard C. Suchyta

[57] ABSTRACT

Methods and apparatus for selecting a system for communication with a personal station, such as a cellular telephone or a PCS station, in a roaming area. The personal station transmits a system access message to a default system. When the default system that receives the system access message is a visited system in the roaming area and the personal station is not registered with the visited system, the visited system registers the presence of the personal station in the roaming area with a home system for the personal station. The home system sends a response including a selection indication to the personal station through the visited system. The selection indication contains selection information for controlling selection of a system for communication with the personal station in the roaming area. The personal station selects a system for communication in the roaming area in accordance with the selection information.

10 Claims, 10 Drawing Sheets

METHOD AND APPARATUS FOR SELECTING A CELLULAR SYSTEM FOR COMMUNICATION WITH A CELLULAR TELEPHONE IN A ROAMING AREA

FIELD OF THE INVENTION

This invention relates to cellular telephone systems and, more particularly, to a method for selecting a cellular system for communication with a cellular telephone located in a roaming area outside its home service area.

BACKGROUND OF THE INVENTION

The cellular telephone network is divided into cellular geographic service areas (CGSA). Each cellular geographic service area has at least two cellular operators. System A is a non-wireline operator, and System B is a wireline operator. Each cellular subscriber is served in its home CGSA by either System A or System B, known as the home cellular system. Because of the mobile nature of a cellular telephone, also known as a cellular subscriber station (CSS), the cellular telephone may roam outside the home cellular geographic service area. The operator of the home cellular system usually must have a roaming agreement with the system operator in another CGSA before its cellular subscribers are allowed to roam into and be served by that system operator.

A cellular company may offer cellular services in a number of cellular geographical service areas. In some service areas, the company may offer cellular services as System B operator, and, in other service areas, the company may offer cellular services as System A operator. A cellular subscriber in System B of one service area may roam into another service area, where the same company is the System A operator. In order to obtain increased revenue, the cellular company would prefer to serve the cellular subscriber in both service areas. However, the typical cellular telephone tunes to a default cellular system when it enters a roaming area. The default system may be controlled by a different company from the home system of the cellular subscriber. If the cellular subscriber is permitted to communicate through the default system, the operator of the home system is unable to serve the cellular subscriber in the roaming area. Furthermore, the cellular subscriber may be charged a higher rate by the operator of the default system.

One prior art solution to this problem is disclosed in U.S. Pat. No. 4,916,728 issued Apr. 10, 1990 to Blair. A cellular telephone stores a list of excluded, or negative, system identifications (SIDs) and is programmed to scan the available cellular frequencies in search of a home SID carrier signal or, alternatively, for a carrier signal associated with an SID that is not on the exclusion list, and to indicate the availability of a carrier signal on a status display. An override due to an emergency call allows dialing of any emergency number, independent of the serving system SID status. A method for selecting a cellular system for communication using an SID list is also disclosed in U.S. Pat. No. 5,159,625 issued Oct. 27, 1992 to Zicker.

The prior art approach wherein the cellular telephone stores a list of negative SIDs has certain disadvantages. Since cellular subscribers are free to purchase their cellular telephones from any manufacturer, not all the cellular telephones used by the subscribers of a particular cellular operator will be capable of storing a list of negative SIDs. Even when the cellular telephone has this capability, the home cellular operator must download the list of negative SIDs to the subscriber's cellular telephone. Either the list of negative SIDs is entered into the cellular telephone at subscription time, or the list of negative SIDs must be automatically downloaded to the cellular telephone after the cellular service is activated. In the first approach, some customers will need to bring the cellular telephone to the home cellular operator or one of its agents. This causes inconvenience to the customer and adds to the cost of operating the cellular system. The latter approach requires the home cellular operator to set up a data call to the cellular telephone to download the list of negative SIDs. The cellular telephone must be equipped with a modem to receive data from the cellular network. Data integrity must be verified to ensure that correct information is stored in the cellular telephone. In case the cellular telephone is inactive at the time of the data call, the cellular network must repeat the data call until the cellular telephone becomes active.

Although the list of negative SIDs may not change frequently, changes cannot be avoided. When a cellular system that is on the list of negative SIDs signs a roaming agreement with the home cellular operator, its SID should be removed from the list of negative SIDs. When the home cellular operator cancels a roaming agreement with a cellular system, that system's SID should be added to the list of negative SIDs. In each case, the list of negative SIDs must be updated in the cellular telephone of each subscriber by one of the above described methods. The list of negative SIDs can be very long if the home cellular operator does not have roaming agreement with many other cellular operators.

Accordingly, there is a need for an improved method for selecting a cellular system for communication with a cellular telephone in a roaming area.

SUMMARY OF THE INVENTION

According to the present invention, a method for selecting a cellular system for communication with a cellular telephone in a roaming area is provided. The cellular telephone has a home cellular system in a home service area. The cellular telephone transmits a system access message to a default cellular system. When the default cellular system that receives the system access message is a visited cellular system in the roaming area and the cellular telephone is not registered with the visited cellular system, the visited cellular system registers the presence of the cellular telephone in the roaming area with the home cellular system. The home cellular system sends a response including a selection indication to the cellular telephone through the visited cellular system. The selection indication contains selection information for controlling selection of a cellular system for communication with the cellular system in the roaming area. The cellular telephone selects a cellular system for communication in the roaming area in accordance with the selection information.

The selection indication may include a negative SID indication, which indicates that the visited cellular system does not have a roaming agreement with the home cellular system. In this case, the cellular telephone selects another cellular system in the roaming area in response to the negative SID indication. The selection indication may include a retune indication, which indicates that another cellular system in the roaming area is preferred. In this case, the cellular telephone retunes to the other cellular system in the roaming area in response to the retune indication. The selection indication may include a preferred indication, which indicates that the visited cellular system is the preferred cellular system in the roaming area. In this case, the visited cellular system is selected in response to the preferred indication.

According to another aspect of the invention, a method for selecting a system for communication with a personal station in a roaming area is provided. The personal station has a home system in a home service area. The personal station transmits a system access message to a default system. When the default system that receives the system access message is a visited system in the roaming area, and the personal station is not registered with the visited system, the visited system registers the presence of the personal station in the roaming area with the home system. The home system sends a response including a selection indication to the personal station through the visited system. The selection indication contains selection information for controlling selection of a system for communication with the personal station in the roaming area. The personal station selects a system for communication in the roaming area in accordance with the selection information.

The personal station may be a cellular telephone, a PCS station or any similar personal radiotelephone station. The home system or the visited system can be a cellular system, PCS system or any similar radiotelephone system. The selection indication may include selection information relating to two or more systems in the roaming area. When communication with more than one system is permitted, the selection information may indicate preferences among the systems in the roaming area.

According to a further aspect of the invention, apparatus for selecting a cellular system for communication with a cellular telephone in a roaming area is provided. The cellular telephone is associated with a home cellular system in a home service area. The apparatus comprises means for transmitting a system access message to a default cellular system, means for receiving a response including a selection indication from the default cellular system, the selection indication containing selection information for controlling selection of a cellular system for communication with the cellular telephone in the roaming area, and means for selecting a cellular system for communication in the roaming area in accordance with the selection information.

BRIEF DESCRIPTION OF THE DRAWINGS

For better understanding of the present invention, reference is made to the accompanying drawings, which are incorporated herein by reference and in which.

DETAILED DESCRIPTION

Figure 1:
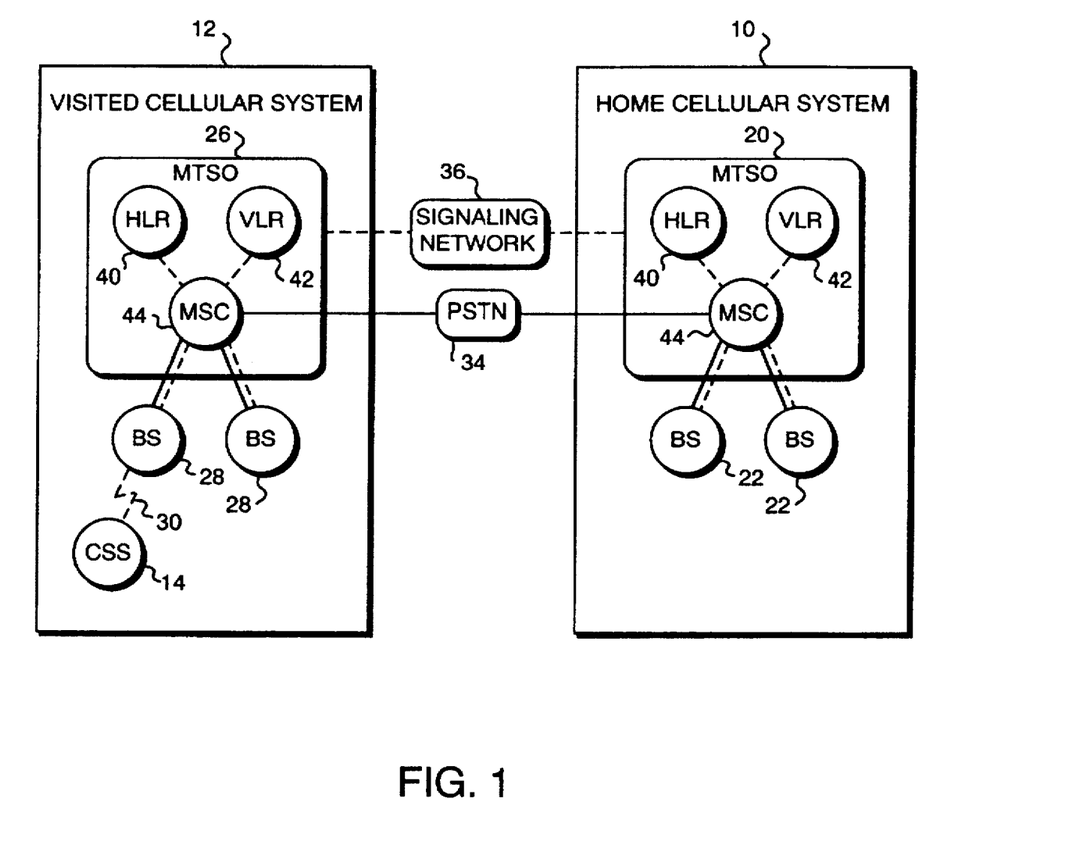
FIG. 1 is a block diagram of a cellular telephone network suitable for practice of the present invention.

A block diagram of a cellular telephone network, including the elements involved in the practice of the present invention, is shown in FIG. 1. A home cellular system 10 is the cellular system that provides cellular services and bills the cellular subscriber for the services. A visited cellular system 12 is not the cellular subscriber's home cellular system, but is currently providing services to the cellular subscriber. A CSS, or cellular telephone, 14 is located within the visited cellular system 12. Cellular system 10 is the home cellular system for cellular telephone 14. The home cellular system 10 includes a mobile telephone switching office (MTSO) 20 and one or more base stations (BS) 22. Voice and data facilities connect the mobile telephone switching office 20 and each of the base stations 22. Similarly, the visited cellular system includes a mobile telephone switching office 26 and one or more base stations 28. The cellular telephone 14 communicates with base station 28 in the visited cellular system 12 via a radio link 30. Each of the mobile telephone switching offices 20 and 26 is the gateway between the cellular system and the public switched telephone network (PSTN) 34. The home cellular system 10 and the visited cellular system 12 are also interconnected by a signaling network 36.

Each of the mobile telephone switching offices 20 and 26 includes a home location register (HLR) 40, a visitor location register (VLR) 42 and a mobile switching center (MSC) 44. The home location register 40 is a database that stores information about the home cellular subscribers. The visitor location register 42 is a database that stores information about the roaming cellular subscribers. The mobile switching center includes equipment for providing radiotelephone services to the cellular telephone. Within the visited cellular system 12, there are interactions between the mobile switching center 44 and the visitor location register 42 and between the mobile switching center 44 and the base stations 28. The interactions between the home and visited cellular systems are between the visitor location register 42 in the visited cellular system 12 and the home location register 40 in the home cellular system 10.

Each of the mobile telephone switching offices 20 and 26 further includes a database that contains information about the cellular systems in other cellular geographic service areas. In particular, the information indicates whether the home cellular system has a roaming agreement with each cellular system and whether each cellular system is preferred with respect to a predetermined criteria, such as roaming rate.

As used herein, a cellular system that does not have a roaming agreement with the roamer's home cellular system is called a "negative" cellular system. Otherwise, it is called a "positive" cellular system. When both cellular systems in the same service area are positive cellular systems, one can be designated as the "preferred" cellular system. For example, the roaming rate of the preferred cellular system may be lower than the roaming rate of the other cellular system in the service area. The home cellular system is always the preferred cellular system in the home service area. Each cellular telephone stores the SIDs of both system A and system B of the service area in which it is currently located, as well as indications of whether they are negative, positive or preferred cellular systems.

When the cellular subscriber first powers on the cellular telephone or when the cellular telephone enters a new service area, the cellular telephone always assumes that both system A and system B are positive cellular systems. A default cellular system is used first for a system access attempt. If the home cellular system is in system A, then the default cellular system for this cellular telephone is system A. The cellular telephone will access the default cellular system first if it is marked as positive. If the visited cellular system is not the home cellular system, the visited cellular system notifies the roamer's home cellular system as to the presence of the roamer. Three cases are possible in these circumstances.

In case A, if the home and visited cellular systems do not have a roaming agreement, the home cellular system informs the cellular telephone through the visited cellular system that the visited system is a negative cellular system. In this case, the cellular telephone marks the current tuned-to system as a negative cellular system. It then retunes to the other cellular system in the same service area. The other cellular system in the same service area may be a positive or negative cellular system, which can be determined after the first system access attempt. It is possible that both cellular systems in the same service area are negative cellular systems. The cellular telephone tunes to the default cellular system in the service area for a period of T1 seconds before checking whether the other cellular system in the same service area has changed from a negative to a positive cellular system. If the non-default cellular system remains as a negative cellular system, the cellular telephone retunes to the default cellular system immediately.

In case B, if the home cellular system has a roaming agreement with both system A and system B operators in the visited service area, and the operator of the visited cellular system has a higher roaming rate, the home cellular system informs the cellular telephone through the visited cellular system that it should access (retune to) the other cellular system in the same service area. In this case, the cellular telephone marks the current tuned-to system as a positive cellular system and the other cellular system in the same service area as a preferred cellular system. It then retunes to the other cellular system in the same service area. Both systems in the same service area are positive cellular systems.

In case C, if the visited cellular system is the one to serve the roamer, the cellular telephone knows that the visited cellular system is a positive cellular system when it does not receive a negative SID or retune indication or when its call origination is granted by the visited cellular system. If the current tuned-to system is the preferred cellular system, the home cellular system informs the cellular telephone through the visited cellular system that the visited cellular system is the preferred cellular system.

The following is a description of the operations performed by the cellular telephone, the home cellular system and a visited cellular system in selecting a cellular system for communication with the cellular telephone in a roaming area. It will be understood that the operations illustrated in FIGS. 2A, 2B, 2C, 2D, 3 and 4 are examples of suitable implementations of the invention and that other implementations are included within the scope of the invention. The following defines terms that are used in the following description and in the drawings.

1. K is used to indicate whether the visited cellular system is the default cellular system. A value of 0 indicates that the visited cellular system is the default cellular system, and a value of 1 indicates that it is not.

2. LSB is the least significant bit.

3. IND( ) is a one-dimensional matrix that indicates whether each of the two cellular systems in the same service area is a negative, positive or preferred cellular system. A value of 0 indicates negative. A value of 1 indicates positive. A value of 2 indicates preferred. IND(0) stores the indicator for system B, and IND(1) stores the indicator for system A. The home cellular system is always the preferred cellular system. When the status of a cellular system is unknown, the value in the corresponding IND( ) is set to 1, indicating positive. Both cellular systems in the same service area may be positive cellular systems. However, only one preferred cellular system is allowed in a service area.

4. SID is the system identification. Every cellular system has a 15-bit SID. A value of 0 at the LSB indicates system B, and a value of 1 at the LSB indicates system A.

5. $SID_P$ is the SID of the home cellular system.

6. $SID_r$ is the SID received from the overhead message over the paging channel specified by the visited cellular system.

7. $SID_S$ is the SID received from the overhead broadcast message over the forward control channel during the initialization task.

8. SID( ) is a one-dimensional matrix that stores the SIDs of the two cellular systems in the same service area. SID(0) stores the SID of system B, and SID(1) stores the SID of system A.

9. X represents the current tuned-to system. A value of 0 indicates system B, and a value of 1 indicates system A.

10. T1 is a timer which is set when both cellular systems in the same service area are negative cellular systems, and the current tuned-to system is the default cellular system. When the timer T1 expires, the cellular telephone retunes to the non-default cellular system to determine whether the situation has changed.

11. T2 is a timer which is set when the preferred cellular system is not accessible, for example, due to congestion or a weak signal. The cellular telephone retunes to the other cellular system, if the other cellular system is a positive cellular system, and is served in that system. When the timer T2 expires, the cellular telephone retunes to the preferred cellular system to determine whether the situation has changed.

It is assumed that IND( ) and SID( ) are stored in the cellular telephone's permanent memory. If this is not the case, then the cellular telephone resets the values of IND( ) to 1, indicating positive, the SID of the default cellular system to $SID_P$ and the SID of the non-default cellular system to 0 during the initialization task when the cellular telephone is powered on.

The cellular telephone also stores a list of emergency phone numbers or codes. The cellular subscriber is allowed to program the list of emergency phone numbers or codes. In case the cellular subscriber enters a number that is not considered an emergency number, the visited cellular system sends a response to the cellular telephone indicating negative SID.

The operations performed by the cellular telephone 14 are illustrated in FIGS. 2A–2D. These operations are preferably implemented as software routines that run on the microprocessor in the cellular telephone. When the cellular subscriber powers on the cellular telephone in step 100 (FIG. 2A), the cellular telephone enters an initialization task which is defined in standards for cellular telephone operation (for example, EIA/TIA-553 and IS-54). At the beginning of the initialization task, the cellular telephone sets X, the current tuned-to system (system A or system B) to the default cellular system based on the SID of the home cellular system, $SID_P$, in step 102. If the home cellular system is system B,X is set to 0, and if the home cellular system is system A, X is set to 1. The variable K, which indicates whether the visited cellular system is the default cellular system, is set to 0 in step 102. The cellular telephone then determines in step 104 whether the other cellular system in the same service area is a preferred cellular system, by determining whether IND($\overline{X}$)=2. If the other cellular system is a preferred cellular system, the cellular telephone reverses X in step 106, tunes to the other cellular system in the same service area in step 108 and waits for the overhead message in step 110. Reversing the value of X in step 106 effectively changes the current tuned-to system from system A to system B, or vice versa. If the other cellular system in the service area is not a preferred cellular system, the cellular telephone remains tuned to the default system and waits for the overhead message in step 110.

Figure 2A:
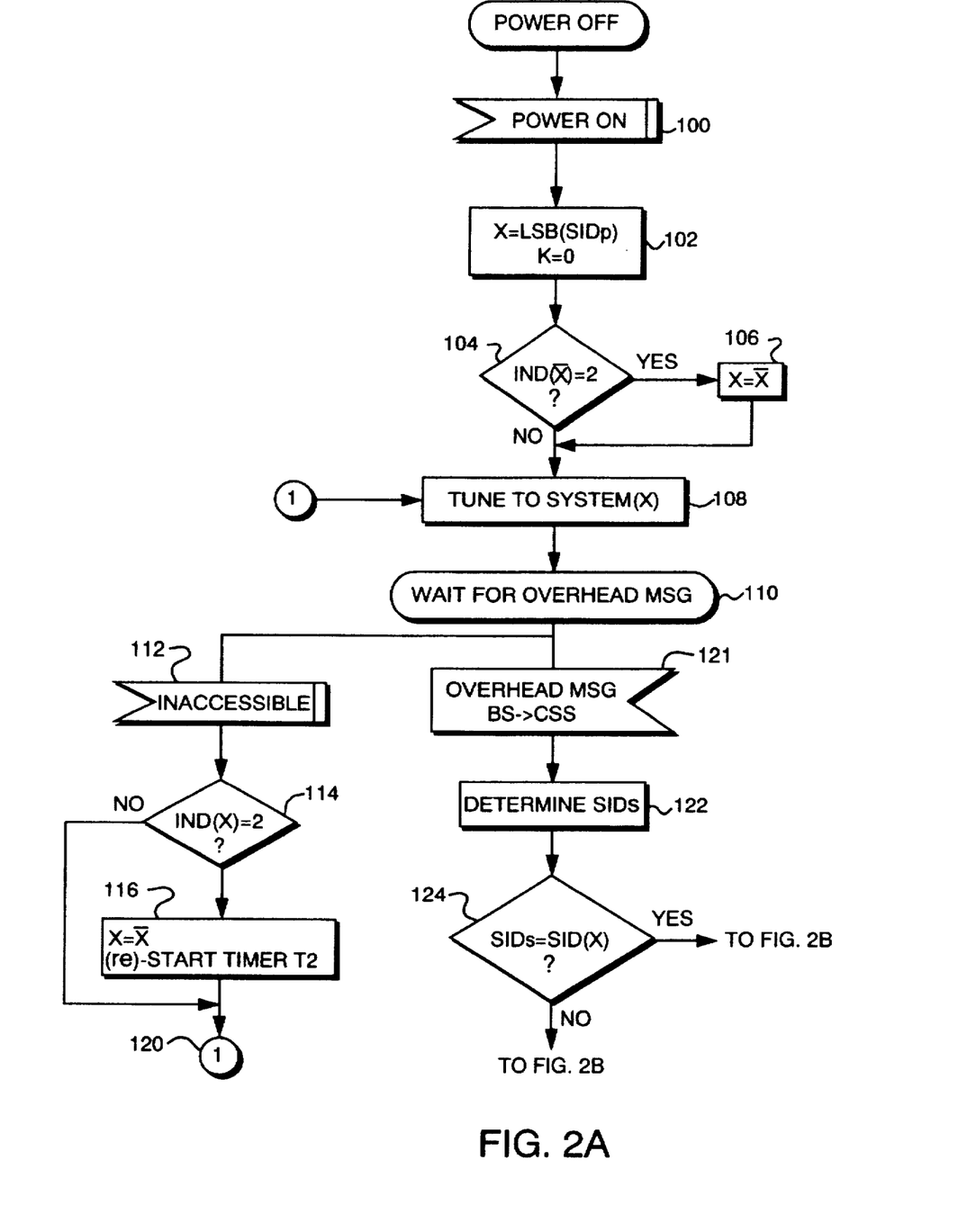
FIGS. 2A–2F show a flow chart of the operations performed by a cellular telephone in selecting a cellular system for communication in accordance with the invention.

The current tuned-to system may be inaccessible due to congestion or a weak signal as indicated in step 112. In that case, the cellular telephone determines in step 114 whether the current tuned-to system is the preferred cellular system, by determining whether IND(X)=2. If the current tuned-to system is the preferred cellular system, the cellular telephone reverses X and starts or restarts the timer T2 in step 116. The cellular telephone then goes to circle 120, which represents a return to step 108. If the current tuned-to system is not a preferred cellular system, the cellular telephone goes to circle 120 directly.

If the current tuned-to system is accessible, the cellular telephone follows standard procedures to receive the overhead message over the control channel in step 121 and to retrieve and determine $SID_s$ from the overhead message in step 122. In step 124, the cellular telephone determines whether the $SID_s$ matches SID(X), the SID of the current tuned to system.

If the $SID_s$ received from the overhead message is the same as SID(X), which indicates that the cellular telephone is still in the same tuned-to system, the cellular telephone determines in step 126 whether $SID_s$ matches $SID_P$, which indicates that the SID received from the overhead broadcast message is the SID of the home cellular system, the cellular telephone sets IND(X) to 2, indicating preferred, and IND($\overline{X}$) to 1, indicating positive, in step 128. The cellular telephone then goes to circle 130, which represents a transition to step 200 in FIG. 2B. When $SID_s$ does not match $SID_P$ in step 126, the cellular telephone goes directly to circle 130.

When the $SID_s$ is not the same as SID(X), as determined in step 124, the cellular telephone has entered a new cellular geographic service area. The cellular telephone then cancels timer T1 or T2 if not already expired, stores SIDas the SID of the current tuned to system and sets IND(X) to 1, indicating a positive cellular system, in step 136. It is noted that the timers T1 and T2 cannot be active at the same time. In addition, a cellular system is always marked positive before its status as negative, positive or preferred is verified. The cellular telephone then determines in step 140 whether the current tuned to system is the default cellular system by determining whether X, the current tuned-to system, equals the least significant bit of $SID_P$. If the answer is no, the cellular telephone reverses the value of X, sets K equal to 1, sets SID(X) to zero, indicating unknown, and sets IND(X) to 1, indicating positive, in step 142. The cellular telephone then goes to circle 144, which represents a return to step 108. When the answer in step 140 is yes and the current tuned-to system is determined in step 146 to be the home cellular system ($SID_s=SID_p$), the cellular telephone sets IND(X) to 2, indicating preferred, in step 148 and goes to circle 150, which represents a transition to step 202 in FIG. 2B. When the current tuned-to system is not the home cellular system, as determined in step 146, the cellular telephone goes directly to circle 150.

Figure 2B:
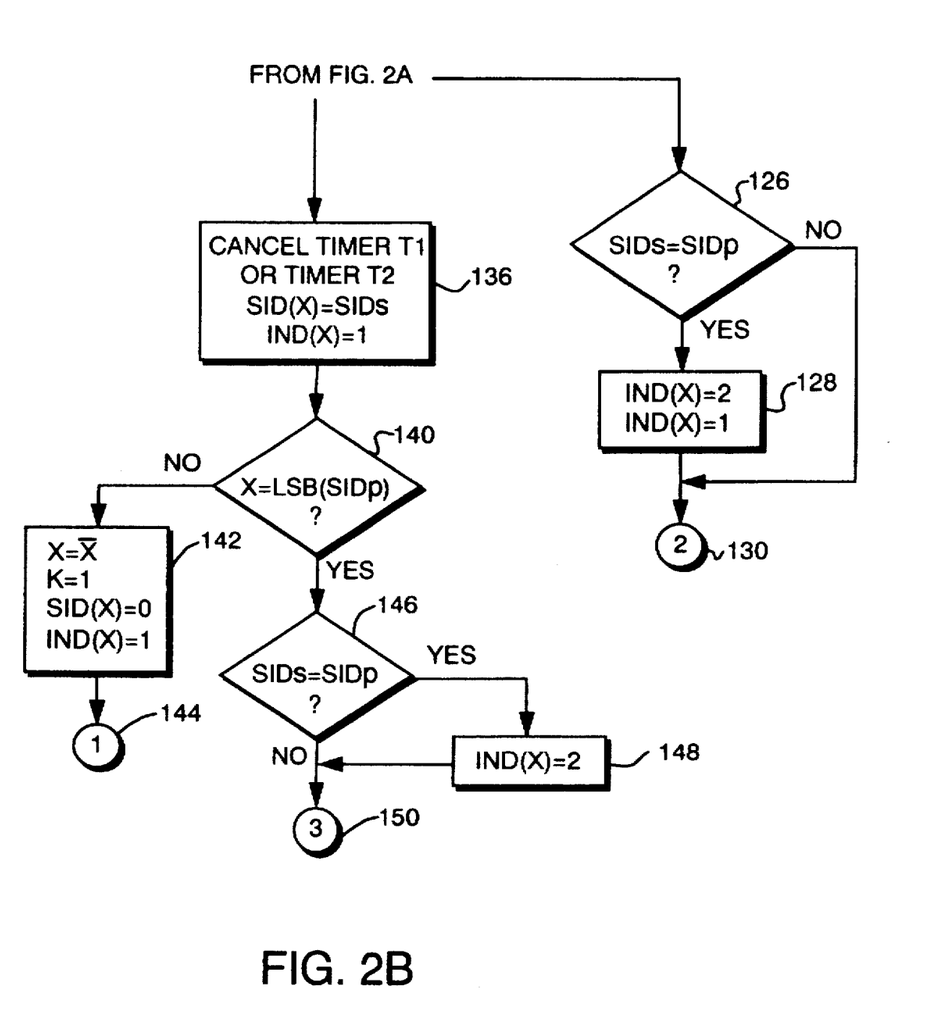

With reference to FIG. 2B, the cellular telephone determines in step 202 whether K is 0. A determination that K is 0 indicates that the visited cellular system in the new service area is the default cellular system. The cellular telephone sets SID($\overline{X}$) to 0 indicating unknown and IND($\overline{X}$) to 1 indicating positive in step 204. The cellular telephone then goes to circle 206 which represents a transition to step 208.

In step 200 of FIG. 2B, the cellular telephone determines whether the non-tuned-to system in the same service area is a preferred cellular system, by determining whether IND($\overline{X}$)=2. It is possible that the preferred cellular system becomes congested, so that the cellular telephone accesses the other positive cellular system in the same service area. If this check is not performed, the cellular telephone may stay at that positive cellular system and never return to the preferred cellular system. If the other cellular system in the same service area is the preferred cellular system, the cellular telephone determines in step 210 whether the timer T2 has expired. If the timer T2 has not expired the cellular telephone goes to circle 212, which represents a transition to step 208. If the timer T2 has expired, the cellular telephone retunes to the other cellular system in the same service area by reversing the value of X in step 214. The cellular telephone then goes to circle 216, which represents a return to step 108 (FIG. 2A). If the other cellular system in the same service area is not a preferred cellular system, the cellular telephone determines in step 220 whether the current tuned-to system is a negative cellular system, by determining whether the value of IND(X) is zero. If the current tuned-to system is not a negative cellular system, the cellular telephone goes to circle 206, which represents a transition to step 208. If the current tuned-to system is a negative cellular system, the cellular telephone determines in step 222 whether the non-tuned-to system in the same service area is a negative cellular system, by determining whether IND($\overline{X}$) is zero. If the non-tuned-to system in the same service area is not a negative cellular system, the cellular telephone retunes to the other cellular system in the same service area by reversing the value of X in step 214 and proceeding to circle 216. If both the current tuned-to system and the non-tuned-to system in the same service area are negative cellular systems, the cellular telephone determines in step 224 whether the current tuned-to system is a default cellular system (see step 140 above). If the current tuned-to system is not the default cellular system, the cellular telephone retunes to the other cellular system in the same service area by reversing the value of X in step 214 and proceeding to circle 216. If the current tuned-to system is the default cellular system, the cellular telephone starts the timer T1 in step 226 and indicates in step 228 that no access is allowed due to negative SIDs, with the exception of emergency calls. The indication can be in the form of sound, light or visual display, or a combination thereof. The cellular telephone then proceeds to circle 206.

In step 208, the cellular telephone performs normal processing for updating overhead information. The cellular telephone then tunes to the paging channel specified in the overhead message received during the initialization task (step 230) and waits for the overhead message in step 232. If the current tuned-to system is inaccessible due to congestion or weak signal (step 234), the cellular telephone reverses X in step 236 and proceeds to circle 238, which represents a return to step 108. When an overhead message is received over the paging channel in step 240 and the $SID_r$ is determined in step 242, the cellular telephone determines in step 244 whether $SID_r$ received on the overhead message is the same as $SID_s$, the SID received from the overhead broadcast message over the forward control channel during the initialization task. If $SID_r$ is the same as $SID_s$, the cellular telephone follows normal processing for verifying overhead information in step 246 and proceeds to the idle state in step 248. When $SID_r$ is not the same as $SID_s$, the tuned-to cellular system has changed. The cellular telephone cancels timer T1 or T2 if not expired, sets both SID(X) and SID($\overline{X}$) to zero, indicating unknown, and marks both cellular systems in the same service area positive by setting IND(X) and IND($\overline{X}$) to one in step 250. The cellular telephone then determines in step 252 whether the current tuned- to system is the default cellular system (see step 140 above). When the current tuned-to system is not the default cellular system, the cellular telephone retunes to the other cellular system in the same service area by reversing X in step 254 and proceeding to circle 256, which represents a return to step 108. When the current tuned-to system is the default cellular system, the cellular telephone proceeds to circle 256 directly.

Figure 2C:
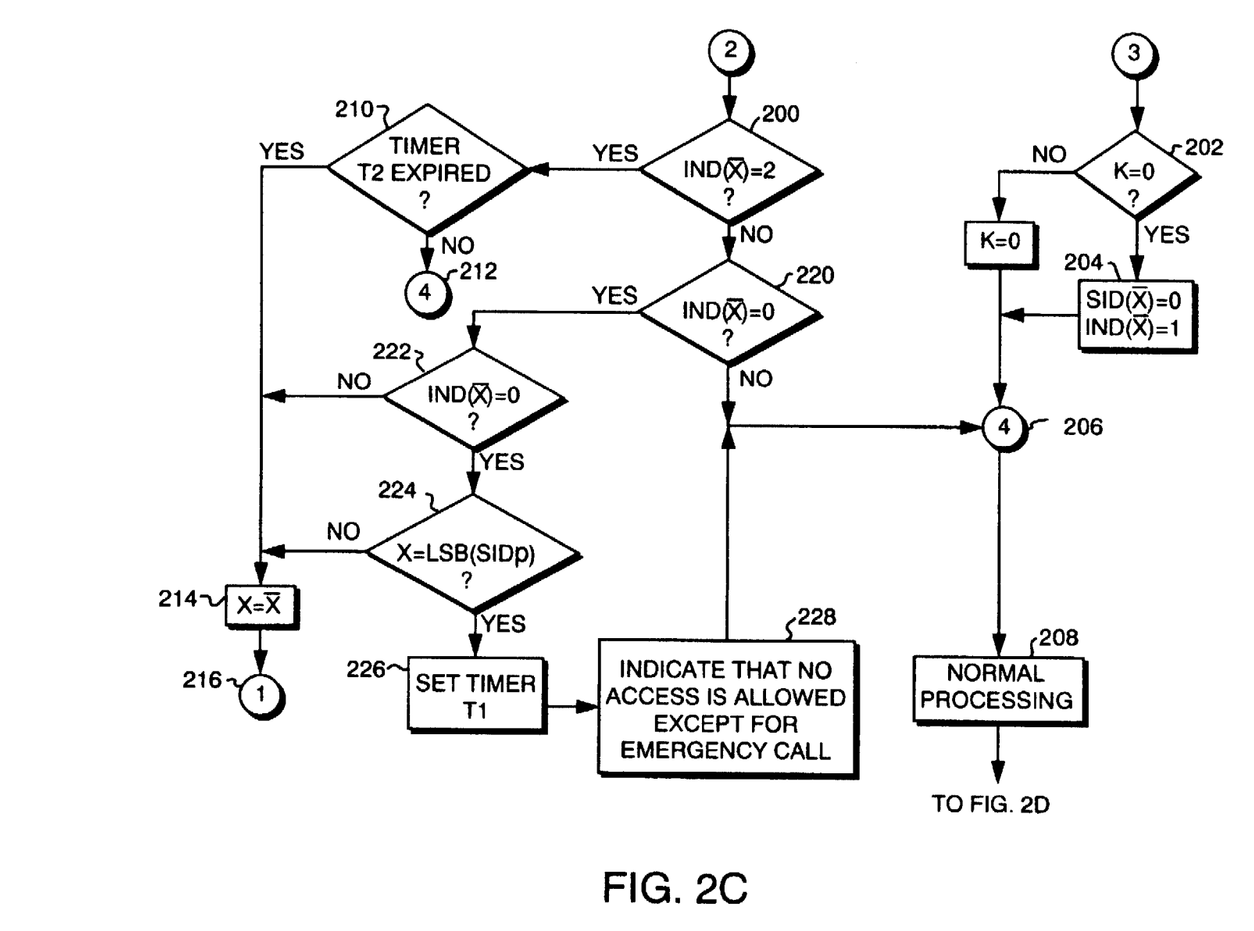
Figure 2D:
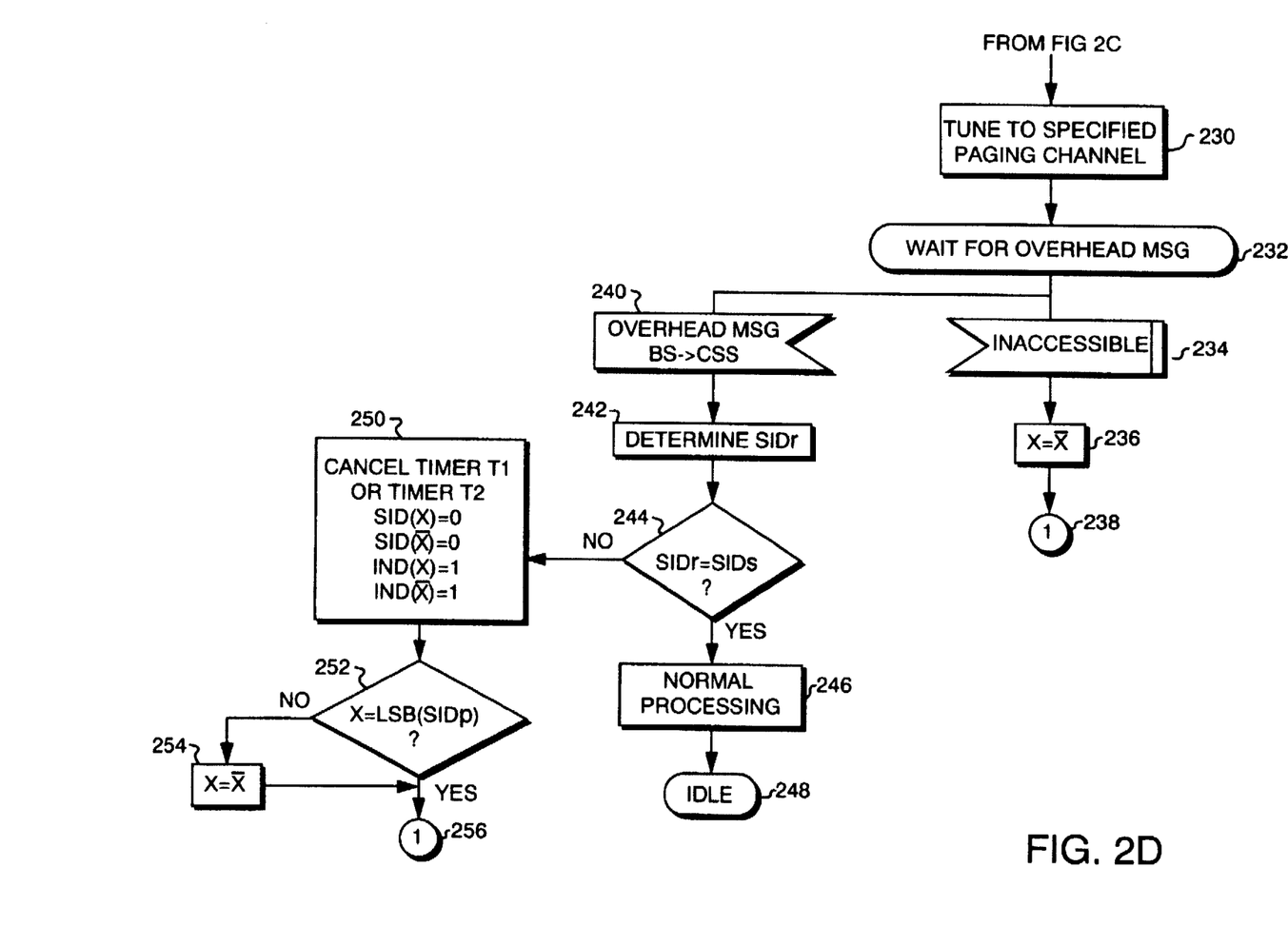
Figure 2E:
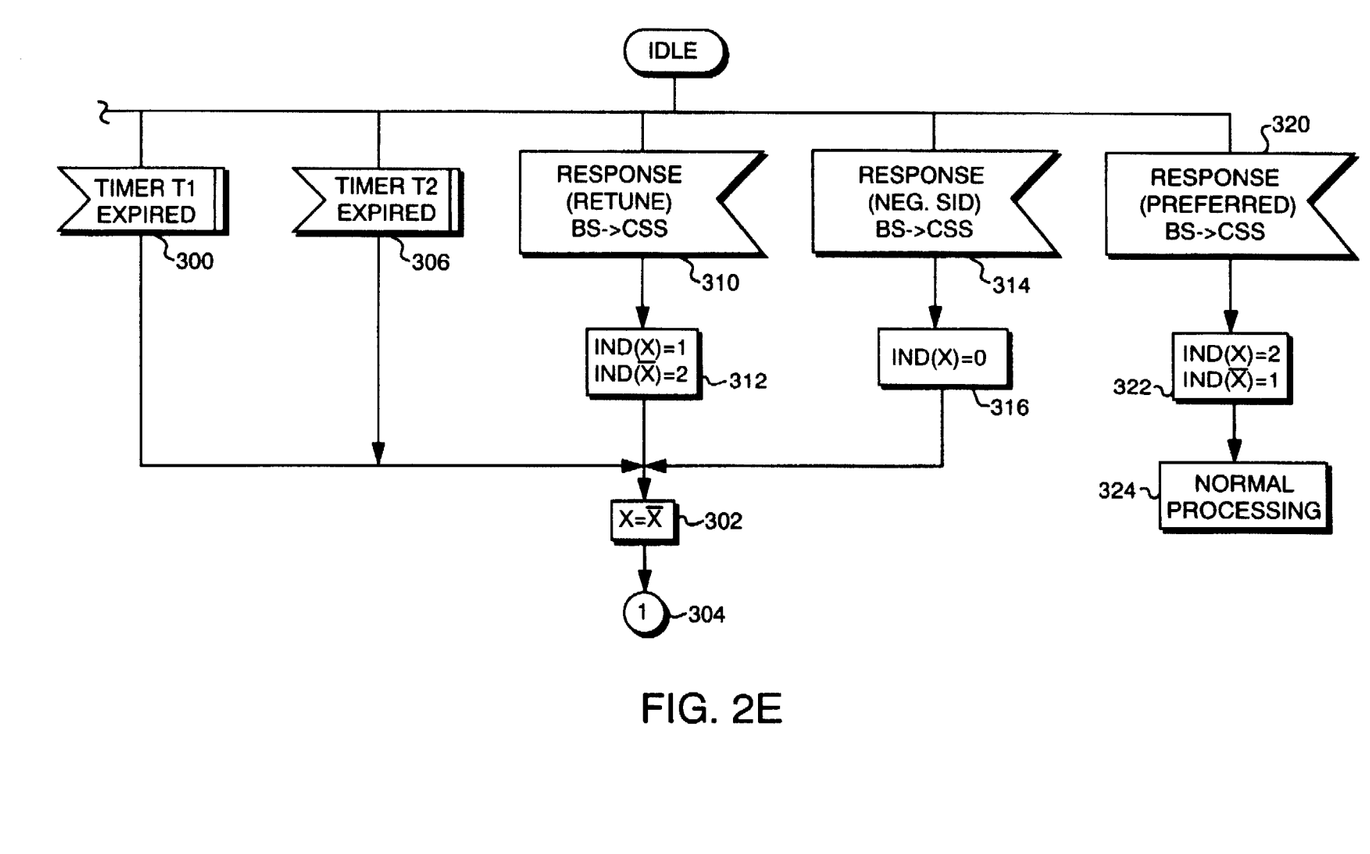
Figure 2F:
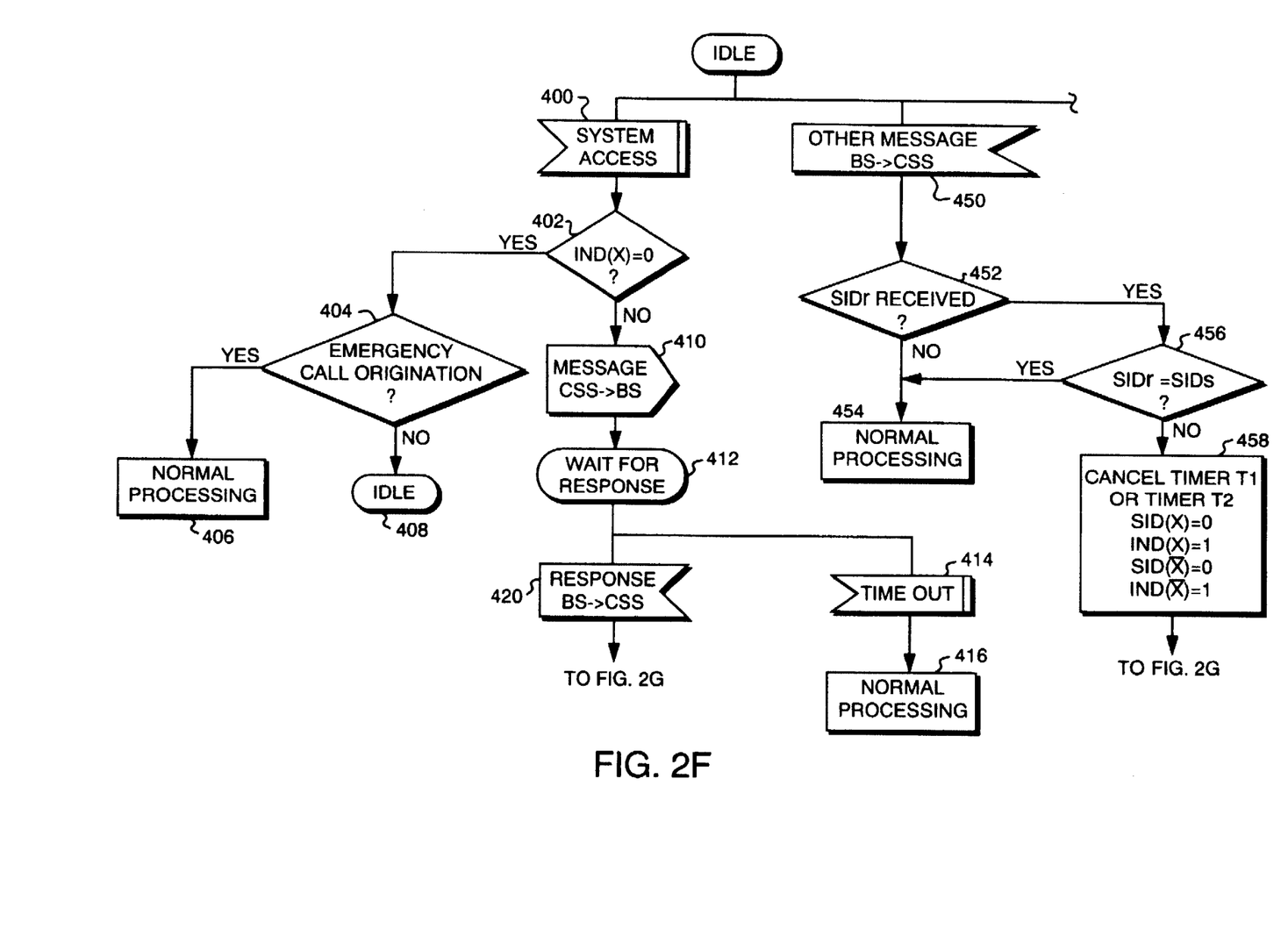

The operations of the cellular telephone following the idle state are shown in FIGS. 2C and 2D. In the idle state, the cellular telephone may detect the need to send a system access message, which can be generated by the cellular subscriber (call origination) or by the cellular telephone itself (autonomous registration). The cellular telephone also may receive a message from the serving system through the base station 28. The timer T1 that is set in step 226 of FIG. 2B and the timer T2 that is set in step 116 of FIG. 2A may expire. With reference to FIG. 2C, when the timer T1 expires in step 300, this indicates that both cellular systems in the service area are negative cellular systems, and the cellular telephone has stayed in the default cellular system for the period of T1 seconds. It is time for the cellular telephone to tune to the non-default system and determine whether anything has happened in that system. The reason for this check is that it is possible that a cellular operator may operate the same cellular system (for example system B) in two adjacent service areas and use the same SID for both cellular systems. For example, system B in service area CGSA-1 and service area GCSA-2 may use SID-A and are negative cellular systems. System A in service area CGSA-1 uses SID-B and is a negative cellular system. System A in service area CGSA-2 uses SID-C and is a positive cellular system. If the cellular telephone's default cellular system is system B and if the cellular telephone stays tuned-to system B without checking the non-default cellular system, the cellular telephone will block all system accesses while in system B of service area CGSA-2 after it has moved from service area CGSA-1 to service area CGSA-2. Using the timer T1 to determine whether the situation at the non-default cellular system has changed from negative to positive allows the roaming cellular subscribers to be served when that situation occurs. Otherwise, the cellular telephone retunes to the other cellular system in the same service area in step 302 and goes to circle 304 which represents a return to step 108 in FIG. 2A.

When the timer T2 expires in step 306, this indicates that the cellular telephone is now in a positive cellular system, and the non-tuned-to system is a preferred cellular system. The reason that the cellular telephone is not in the preferred cellular system is because the preferred cellular system is inaccessible due to congestion or weak signal. When the timer T2 expires, the cellular telephone has stayed in the positive cellular system for the period of T2 seconds and it is time for the cellular telephone to determine whether the preferred cellular system is now accessible. The cellular telephone retunes to the other cellular system in the same service area, which is a preferred cellular system, in step 302 and proceeds to circle 304.

If a message indicating retune is received from the visited cellular system in the idle state in step 310, the cellular telephone marks the current tuned-to system as a positive cellular system and the non-tuned-to cellular system in the same service area as a preferred cellular system in step 312, by setting IND(X) to 1 and IND($\overline{X}$) to 2. The cellular telephone then retunes to the other cellular system in step 302 and proceeds to circle 304.

If a message indicating negative SID is received from the visited cellular system in the idle state in step 314, the cellular telephone marks the current tuned-to system as a negative cellular system by setting IND(X) to 0 in step 316. The cellular telephone then retunes to the other cellular system in the same service area in step 302 and proceeds to circle 304.

If a message indicating preferred is received from the visited cellular system in the idle state in step 320, the cellular telephone marks the current tuned-to system as a preferred cellular system and the non-tuned-to cellular system in the same service area as a positive cellular system in step 322, by setting IND(X) to 2 and IND($\overline{X}$) to 1. The cellular telephone then proceeds with normal processing by returning to the idle state in step 324.

The remaining operations following the idle state are shown in FIG. 2D. When system access is detected in step 400, the cellular telephone determines whether the current tuned-to system is a negative cellular system in step 402 by determining whether IND(X) is 0. If the current tuned-to-system is a negative cellular system, the cellular telephone determines in step 404 whether the system access is related to an emergency call. If the system access is related to an emergency call, the cellular telephone proceeds in step 406 with normal processing for completing the emergency call. When the system access is not related to an emergency call, the cellular telephone returns to the idle state in step 408. As indicated above, the cellular telephone indicates to the cellular subscriber when both cellular systems in the same service area are negative cellular systems.

When the current tuned-to system is not a negative cellular system, the cellular telephone follows normal procedures by sending a message to the visited cellular system in step 410 and waiting for a response in step 412. If the cellular telephone times out waiting for the response in step 414, it returns to the idle state in step 41 6. Appropriate indications, such as displaying the "try again" message for the case of call origination, may be given to the cellular subscriber. If a response is received in step 420 and the received response indicates negative SID in step 422, the cellular telephone marks the current tuned-to system as a negative cellular system by setting IND(X) to 0 in step 424. The cellular telephone then retunes to the other cellular system in the same service area in step 426 and proceeds to circle 428, which represents a return to step 108 in FIG. 2A. If the received response indicates retune in step 430, the cellular telephone marks the current tuned-to system as a positive cellular system and the non-tuned-to cellular system in the same service area as a preferred cellular system in step 432, by setting IND(X) to 1 and IND($\overline{X}$) to 2. The cellular telephone then retunes to the other cellular system in step 426 and proceeds to circle 428. If the received response indicates preferred in step 434, the cellular telephone marks the current tuned-to system as a preferred cellular system and the non-tuned-to cellular system in the same service area as a positive cellular system in step 436, by setting IND(X) to 2 and IND($\overline{X}$) to 1. The cellular telephone then follows normal processing by returning to the idle state in step 438. If negative SID or retune or preferred is not indicated in the received message, or a regular call processing message such as channel assignment message is received, the cellular telephone follows normal processing for processing the response messages in step 438.

If any other message is received from the visited cellular system in step 450, the cellular telephone determines in step 452 whether an SID$_r$ was received. If SID$_r$ was not received, the cellular telephone follows normal processing by returning to the idle state in step 454. If SID$_r$ is received in the message, the cellular telephone determines in step 456 whether the SID$_r$ is the same as SID$_s$, the SID received from the overhead broadcast message during the initialization task. If the SID$_r$ is the same as the SID$_s$, the cellular telephone follows normal message processing in step 454. If the SID$_r$ is not the same as the SIDthis indicates that the current tuned-to system has changed. The cellular telephone cancels the timer T1 or T2 if not expired yet, sets both SID(X) and SID($\overline{X}$) to 0, indicating unknown, and marks the cellular systems in the same service area positive by setting IND(X) and IND($\overline{X}$) to 1 in step 458. The cellular telephone then determines whether the current tuned-to system is the default cellular system in step 460 (see step 140 above). If the current tuned- to system is not the default cellular system, the cellular telephone retunes to the other cellular system in the same service area in step 462 by reversing X and proceeds to circle 464, which represents a return to step 108 (FIG. 2A). When the current tuned-to system is the default cellular system, the cellular system proceeds directly to circle 464.

If the timer T1 is running (both cellular systems in the same service area are negative cellular systems), the only possible call that can be in progress is an emergency call. All other types of calls are blocked by the cellular telephone. If the timer T2 is running, the preferred cellular system is not accessible due to congestion or weak signal. The timer T1 or T2, once set, may expire during any call processing state. In that case, the call processing is not interrupted, and a flag is set to indicate the timer expiration. When the call processing ends, the cellular telephone returns to the idle state. At that time, the cellular telephone detects the expiration of the timer T1 or T2, reverses X and proceeds to step 108 in FIG. 2A.

Figure 3A:
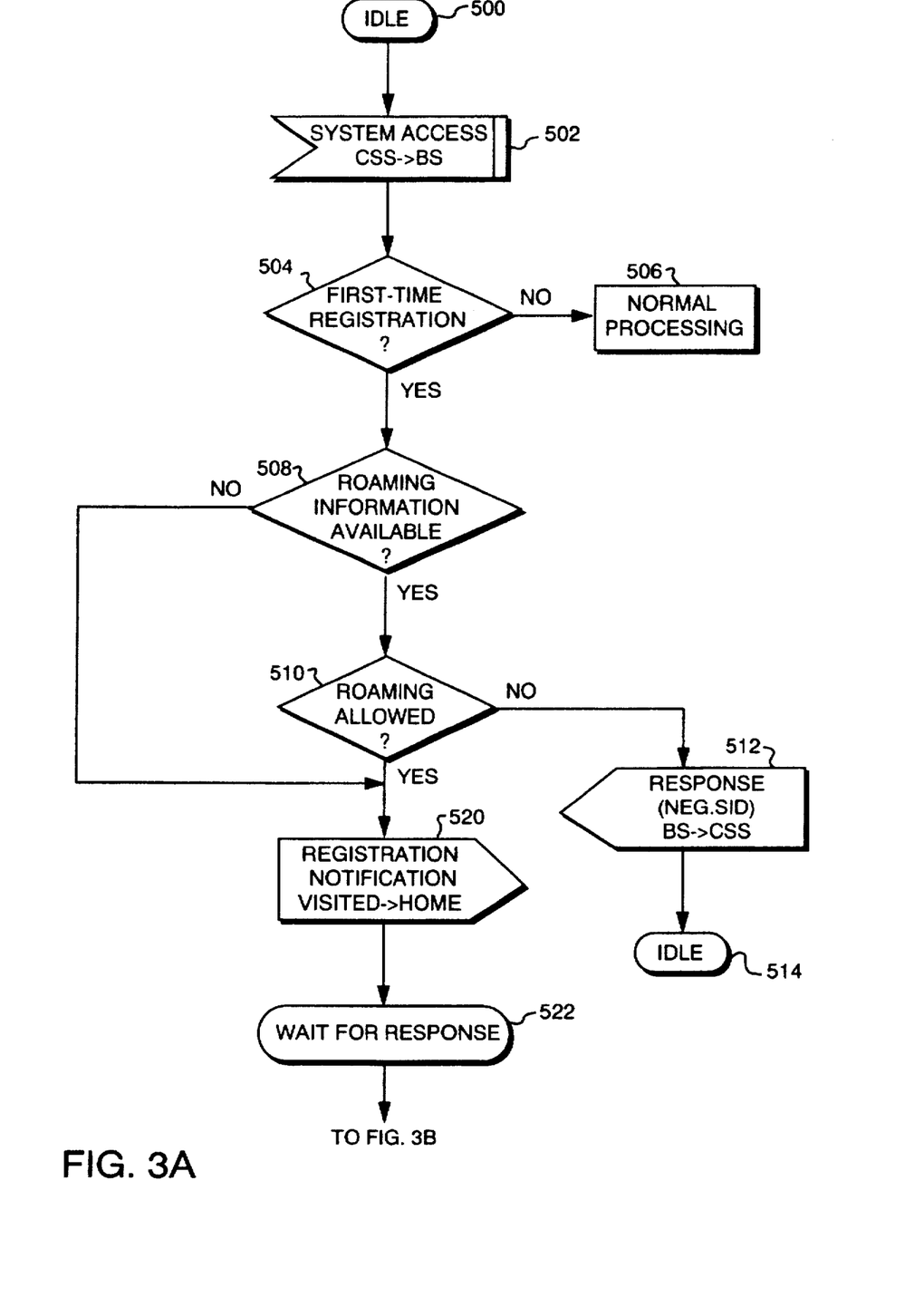
FIG. 3 is a flow chart of the operations performed by the visited cellular system in selecting a cellular system for communication in accordance with the present invention.
Figure 3B:
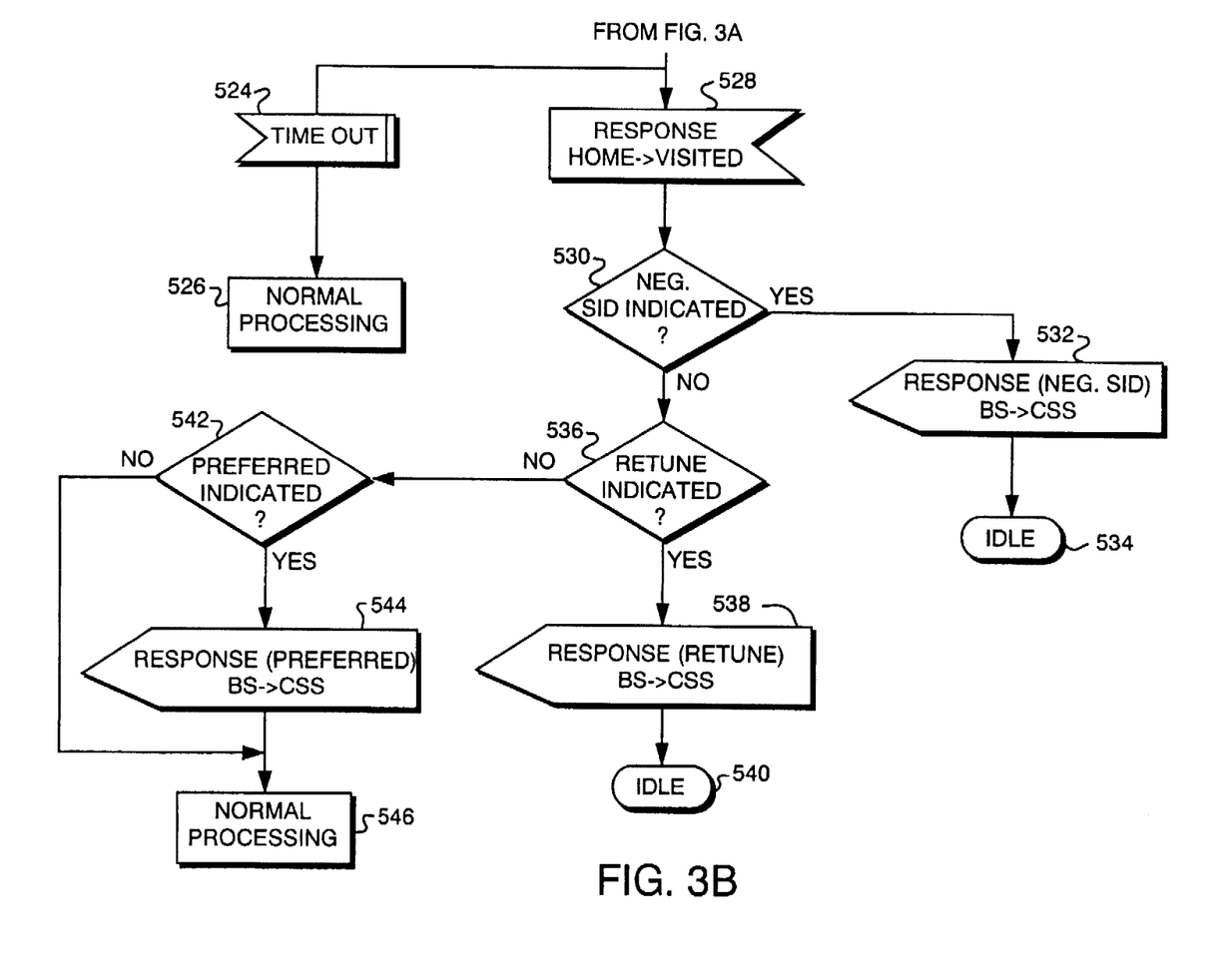

The operations performed by the visited cellular system are shown in FIG. 3. While in the idle state 500, the visited cellular system may receive a system access attempt from the cellular telephone (step 502). The visited cellular system determines in step 504 whether the cellular telephone was previously registered. If the cellular telephone was previously registered, the visited cellular system follows normal processing in step 506. When the cellular telephone was not previously registered, it is determined in step 508 whether there is a roaming agreement between the visited cellular system and the home cellular system of the cellular telephone. If the answer is yes and roaming is not allowed, as determined in step 510, the visited cellular system sends a response to the cellular telephone indicating negative SID in step 512 and proceeds to idle state 514. The visited cellular system has the option of bringing the cellular telephone up to a voice channel and playing an announcement indicating that the visited cellular system does not have a roaming agreement with the home cellular system of the cellular telephone. If roaming information is not available, or roaming is allowed, the visited cellular system sends a registration notification message to the home cellular system in step 520 and waits for a response in step 522.

If the visited cellular system times out waiting for a response (step 524), it follows normal processing for default treatment in step 526. If a response is received in step 528 and the response indicates negative SID in step 530, the visited cellular system sends a message to the cellular telephone indicating negative SID in step 532 and proceeds to idle state 534. If the received response indicates retune (step 536), the visited cellular system sends a message to the cellular telephone in step 538 indicating retune and proceeds to idle state 540. If the received response indicates preferred (step 542), the visited cellular system sends a message to the cellular telephone indicating preferred in step 544 and follows normal processing for handling the system access as required in step 546. If negative SID or retune or preferred is not indicated in the response received from the home cellular system, the visited cellular system follows normal processing in step 546.

Figure 4:
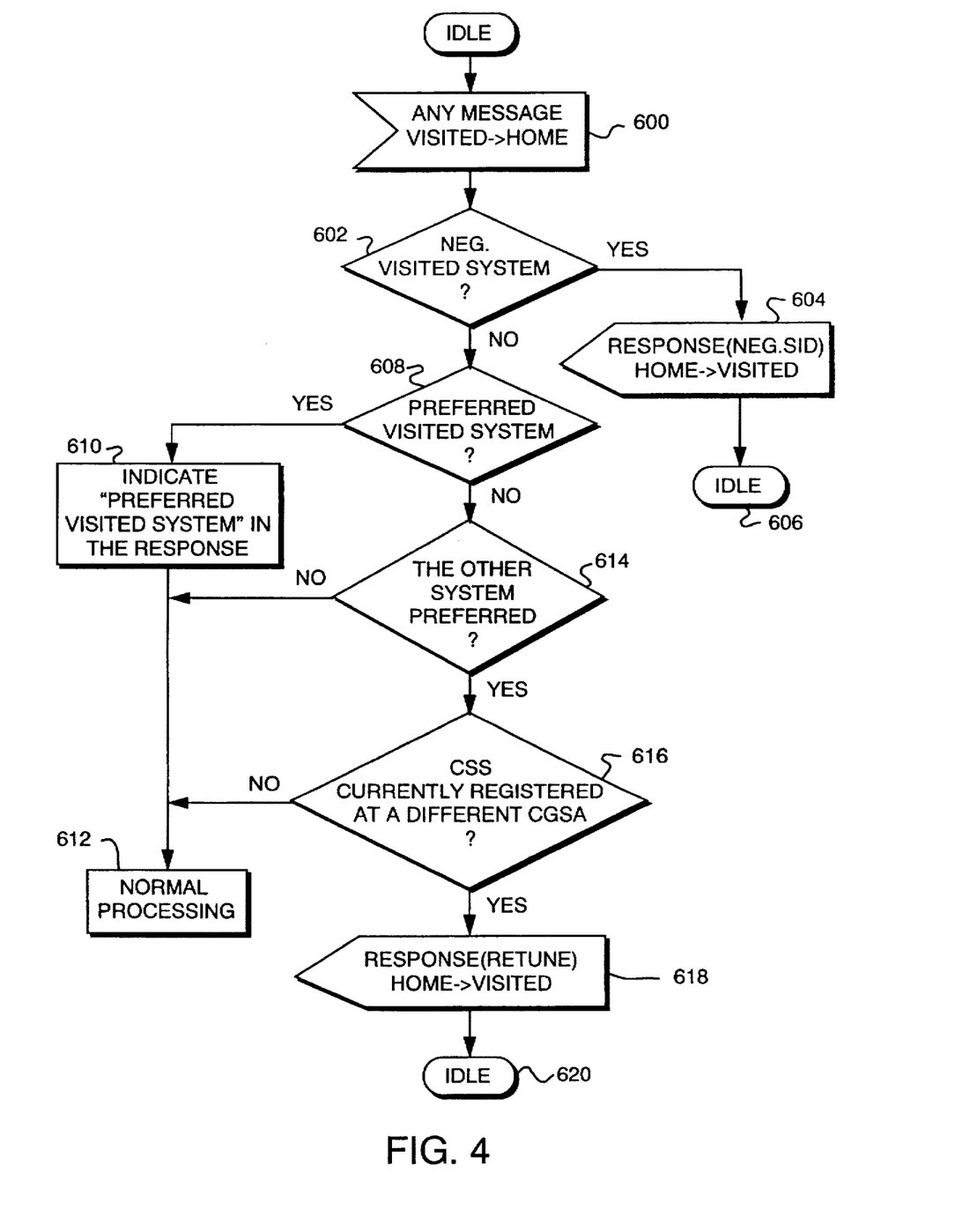
FIG. 4 is a flow chart of the operations performed by the home cellular system in selecting a cellular system for communication in accordance with the invention.

The operations performed at the home cellular system are shown in FIG. 4. When the home cellular system receives any message, such as registration notification, from the visited cellular system (step 600) it determines whether the visited cellular system is a negative cellular system in step 602. If the visited cellular system is a negative cellular system, the home cellular system returns a response to the visited cellular system indicating negative SID in step 604 and proceeds to idle state 606. If the visited cellular system is not a negative cellular system, the home cellular system determines whether the visited cellular system is a preferred cellular system in step 608.

If the visited cellular system is a preferred cellular system, the home cellular system indicates in the response that the visited cellular system is a preferred cellular system (step 610) and follows normal message processing in step 612. If the visited cellular system is not a preferred cellular system, the home cellular system then determines in step 614 whether the other cellular system in the same service area as the visited cellular system is a preferred cellular system. If the other cellular system in the same service area is not a preferred cellular system, the home cellular system follows normal processing in step 612. If the other cellular system in the same service area is a preferred cellular system (step 614) and the cellular telephone is currently registered at a cellular system in a different service area (step 616), the home cellular system returns a response with a retune indication in step 61 8 and proceeds to idle state 620. If the other cellular system in the same service area is a preferred cellular system (step 614) and the cellular telephone is not currently registered at a cellular system in a different service area (step 61 6), the home cellular system follows normal processing procedures in step 612.

The present invention may be implemented as a modification to the software in a conventional cellular telephone network. In particular, a cellular telephone typically includes a microprocessor with a stored program for controlling its operation. The stored program of the cellular telephone may be modified to implement the operations shown in FIGS. 2A–2D and described above. Cellular telephone hardware is disclosed, for example, in U.S. Pat. No. 4,916,728, which is hereby incorporated by reference. Similarly, the mobile switching center 44 of the cellular systems 10 and 12 typically contain a computer for controlling operations. The computers of the mobile switching center 44 in the visited cellular system 12 and home cellular system 10 are modified to incorporate the operations shown in FIGS. 3 and 4, respectively, and described above. As noted above, various modifications of the operations shown in FIGS. 2A–2D, 3 and 4 are included within the scope of the present invention.

Recently there has been much discussion of personal communication services (PCS) in which wallet-size, lightweight, inexpensive personal stations are utilized for radiotelephone communication. Multiple frequencies, different from those used for cellular service, will be allocated for PCS. It is expected that there will be many PCS providers per service area in the PCS environment.

The method of the invention for selecting a cellular system for communication with a cellular telephone has been described thus far in connection with two operators per geographical service area. However, the method can easily be expanded to the PCS environment where multiple operators may be available. Assume that there are N PCS operators in any given PCS service area. If only one PCS operator per service area is used to serve the roamer, then the retune indication and the SID or the spectrum slot can be returned from the home PCS system to the visited PCS system in the manner described above for cellular systems. If multiple PCS operators are allowed per service area and there is no preference among the positive PCS operators, a list of negative SIDs can be downloaded to the visited PCS system. If multiple PCS operators with preference are allowed, the home PCS system may download a list of positive SIDs or spectrum slots and a sequence of preference for the positive PCS operators.

In general, the method of the invention involves a home system, a visited system and a personal station that may roam from the home system to the visited system. The home system and the visited system may be cellular systems, PCS systems or any similar localized communication systems. The personal station may be a cellular telephone, a PCS station or any similar personal radiotelephone station. When the personal station transmits a system access message to the visited system, the visited system registers the presence of the personal station with the home system. The home system sends a response including a selection indication to the personal station through the visited system. The selection indication contains selection information for controlling selection of a system for communication with the personal station in the roaming area. The personal station selects the system for communication in the roaming area in accordance with the selection information.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for selecting a cellular system for communication with a cellular telephone in a roaming area, said cellular telephone having a home cellular system in a home service area, said method comprising the steps of:

said cellular telephone transmitting a system access message to a default cellular system;

when the default cellular system that receives the system access message is a visited cellular system in the roaming area and the cellular telephone is not registered with the visited cellular system, said visited cellular system registering the presence of the cellular telephone in the roaming area with the home cellular system;

said home cellular system sending a response including a selection indication to the cellular telephone through the visited cellular system, said selection indication containing selection information for controlling selection of a cellular system for communication with said cellular telephone in the roaming area, wherein said selection information includes one of a negative SID indication, and a retune indication; and said cellular telephone selecting a cellular system for communication in the roaming area in accordance with said one of the negative SID indication and the retune indication.

2. A method for selecting a cellular system as defined in claim 1, wherein the negative SID indication for the visited cellular system is in response to a database of negative SIDs stored at the home cellular system, the negative SID indication indicating that the visited cellular system does not have a roaming agreement with the home cellular system, and wherein the step of selecting a cellular system includes selecting another cellular system in the roaming area in response to the negative SID indication.

3. A method for selecting a cellular system as defined in claim 1, wherein the retune indication for the visited cellular system is in response to a database of preferred SIDs stored at the home cellular system, the retune indication indicating that another cellular system in the roaming area is preferred, and wherein the step of selecting a cellular system includes returning the cellular telephone to the other cellular system in the roaming area in response to the retune indication.

4. A method for selecting a system for communication with a personal station in a roaming area, said personal station having a home system in a home service area, said method comprising the steps of:

said personal station transmitting a system access message to a default system;

when the default system that receives the system access message is a visited system in the roaming area and the personal station is not registered with the visited system, said visited system registering the presence of the personal station in the roaming area with the home system;

said home system sending a response including a selection indication to the personal station through the visited system, said selection indication containing selection information for controlling selection of a system for communication with said personal station in the roaming area, wherein said selection information includes one of a negative SID indication, and a retune indication and said personal station selecting a system for communication in the roaming area in accordance with said one of the negative SID indication and the retune indication.

5. A method for selecting a system as defined in claim 4, wherein the step of sending a selection indication includes sending to the personal station a list of positive SIDs and a corresponding preference for each of said positive SIDs, the list of positive SIDs being stored in a database at the home system, said list indicating systems in the roaming area with which the home system has a roaming agreement, and wherein the step of selecting a system includes selecting a system from said list.

6. A method for selecting a system as defined in claim 4, wherein the negative SID indication for the visited system is in response to a database of negative SIDs stored at the home system, the negative SID indication indicating that the visited system does not have a roaming agreement with the home system, and wherein the step of selecting a system includes selecting another system in the roaming area in response to the negative SID indication.

7. A method for selecting a system as defined in claim 4, wherein the retune indication for the visited system is in response to a database of preferred SIDs stored at the home system, the retune indication indicating that another system in the roaming area is preferred, and wherein the step of selecting a system includes returning the personal station to the other system in the roaming area in response to the retune indication.

8. In a cellular telephone associated with a home cellular system in a home service area, apparatus for selecting a cellular system for communication with the cellular telephone in a roaming area comprising:

means for transmitting a system access message to a default cellular system;

means for receiving a response including a selection indication from the default cellular system, said selection indication containing selection information for controlling selection of a cellular system for communication with said cellular telephone in the roaming area, wherein said selection information includes one of a negative SID indication, and a retune indication; and     means for selecting a cellular system for communication in the roaming area in accordance with said one of the negative SID indication and the retune indication.

9. Apparatus as defined in claim 8 wherein the negative SID indication for the default cellular system is in response to a database of negative SIDs stored at the home cellular system, the negative SID indication being configured to indicate that the default cellular system does not have a roaming agreement with the home cellular system, and wherein said means for selecting a cellular system includes means for selecting another cellular system in the roaming area in response to the negative SID indication.

10. Apparatus as defined in claim 8 wherein the retune indication for the default cellular system is in response to a database of preferred SIDs stored at the home cellular system, the retune indication being configured to indicate that another cellular system in the roaming area is preferred, and wherein said means for selecting a cellular system includes means for returning the cellular telephone to the other cellular system in the roaming area in response to the retune indication.

* * * * *